(12) United States Patent
Ohno et al.

(10) Patent No.: US 11,912,087 B2
(45) Date of Patent: Feb. 27, 2024

(54) ELECTRIC SUSPENSION APPARATUS

(71) Applicant: HONDA MOTOR CO., LTD., Tokyo (JP)

(72) Inventors: Satoshi Ohno, Tokyo (JP); Kazuya Konada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 150 days.

(21) Appl. No.: 17/675,311

(22) Filed: Feb. 18, 2022

(65) Prior Publication Data

US 2022/0305865 A1   Sep. 29, 2022

(30) Foreign Application Priority Data

Mar. 25, 2021   (JP) ................................. 2021-051516

(51) Int. Cl.
*B60G 17/015*   (2006.01)
*B60G 17/0165*   (2006.01)
*B60G 17/018*   (2006.01)
*B60G 17/0195*   (2006.01)

(52) U.S. Cl.
CPC ..... *B60G 17/0157* (2013.01); *B60G 17/0165* (2013.01); *B60G 17/018* (2013.01); *B60G 17/0195* (2013.01); *B60G 2202/42* (2013.01); *B60G 2202/422* (2013.01); *B60G 2202/442* (2013.01); *B60G 2500/30* (2013.01)

(58) Field of Classification Search
CPC ............ B60G 17/0157; B60G 17/0165; B60G 17/018; B60G 17/0195; B60G 2202/42; B60G 2202/422; B60G 2202/442; B60G 2500/30
See application file for complete search history.

(56) References Cited

U.S. PATENT DOCUMENTS

2005/0023789 A1\* 2/2005 Suzuki ............... B60G 21/0555
280/124.106
2009/0079145 A1\* 3/2009 Inoue ..................... B60G 17/08
267/140.14

(Continued)

FOREIGN PATENT DOCUMENTS

JP   2009-96315 A   5/2009
JP   2016-516389 A   6/2016

(Continued)

OTHER PUBLICATIONS

Japanese Office Action dated Jan. 10, 2023 issued in corresponding Japanese application No. 2021-051516; English machine translation included (7 pages).

*Primary Examiner* — Phutthiwat Wongwian
*Assistant Examiner* — Susan E Scharpf
(74) *Attorney, Agent, or Firm* — Rankin, Hill & Clark LLP (57) ABSTRACT

An electric suspension apparatus includes an electric actuator mounted in a vehicle, the electric actuator being driven with a motor, a voltage determination unit determining whether an electromotive force generated by the motor is equal to or more than a predetermined voltage in a state where regenerative power is generated in the motor, and an instruction unit short-circuiting the motor in a case where the voltage determination unit determines that the electromotive force generated by the motor is equal to or more than the predetermined voltage.

4 Claims, 6 Drawing Sheets

(56) References Cited

U.S. PATENT DOCUMENTS

| | | | | |
|---|---|---|---|---|
| 2010/0032912 A1* | 2/2010 | Inoue | ............... | F16F 15/002 |
| | | | | 280/5.502 |
| 2011/0098887 A1* | 4/2011 | Fujimoto | ............ | B62D 5/0469 |
| | | | | 701/41 |
| 2014/0156130 A1* | 6/2014 | Ogawa | ............... | B60L 7/003 |
| | | | | 903/903 |
| 2016/0001621 A1* | 1/2016 | Kato | ............... | F16F 15/035 |
| | | | | 188/267 |
| 2020/0186058 A1* | 6/2020 | Yukawa | ............... | H02P 6/28 |

FOREIGN PATENT DOCUMENTS

| | | |
|---|---|---|
| WO | 2007/108316 | 9/2007 |
| WO | 2014/145220 A2 | 9/2014 |

\* cited by examiner

ELECTRIC SUSPENSION APPARATUS

INCORPORATION BY REFERENCE

The present application claims priority under 35 U.S.C. § 119 to Japanese Patent Application No. 2021-051516 filed on Mar. 25, 2021. The content of the application is incorporated herein by reference in its entirety.

BACKGROUND OF THE INVENTION

Field of the Invention

The present invention relates to an electric suspension apparatus.

Description of the Related Art

Heretofore, a technology concerning an electric suspension apparatus mounted in a vehicle and driven with a motor has been known.

For example, in an electric suspension apparatus described in International Publication No. WO 2007/108316, in a case where a charge state of a battery which supplies power to a motor is a highly charged state, a state of generating a constant force that is a constant actuator force to increase and decrease a vehicle height is forcibly achieved, to consume power from the battery and eliminate the highly charged state of the battery.

In an electric suspension apparatus described in International Publication No. WO 2007/108316, however, rapid voltage rise might occur in a state where regenerative power is generated by a motor.

The present invention is intended to provide a vehicle control device which suppresses rapid voltage rise due to regenerative power of a motor in an electric suspension apparatus.

SUMMARY OF THE INVENTION

An aspect of the present invention is an electric suspension apparatus including an electric actuator mounted in a vehicle, the electric actuator being driven with a motor, wherein in a case where a drive voltage of the motor is equal to or more than a predetermined voltage, the motor is short-circuited.

In another aspect of the present invention, in a case where a change amount of the drive voltage per unit time is equal to or more than a predetermined change amount, the motor is short-circuited.

In still another aspect of the present invention, in a case of short-circuiting the motor, supply of power to the motor is stopped.

In a further aspect of the present invention, the electric actuator is disposed in each of a plurality of wheels, and in a case where the drive voltage is equal to or more than the predetermined voltage in association with stroke fluctuation of the electric actuator disposed in a front wheel, the short circuit of the motor disposed in each of the plurality of wheels is held until stroke fluctuation of the electric actuator disposed in a rear wheel ends.

According to an aspect of the present invention, rapid voltage rise due to regenerative power of a motor in an electric suspension apparatus can be suppressed.

DETAILED DESCRIPTION OF THE PREFERRED EMBODIMENT

Hereinafter, an embodiment of the present invention will be described with reference to the drawings.

1. Configuration of Electric Suspension Apparatus

Figure 1:
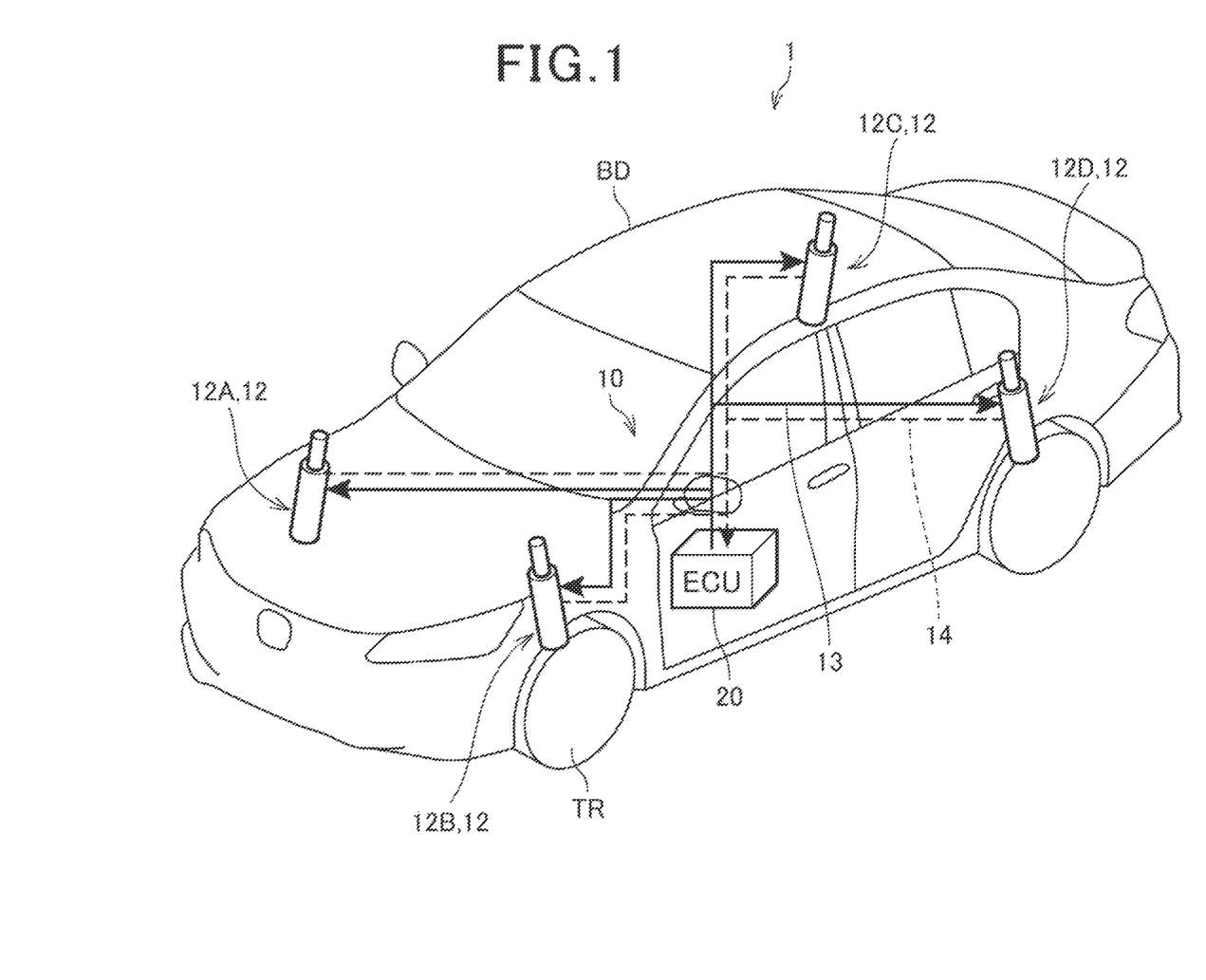
FIG. 1 is a perspective view showing an example of arrangement of an electric suspension apparatus.
Figure 2:
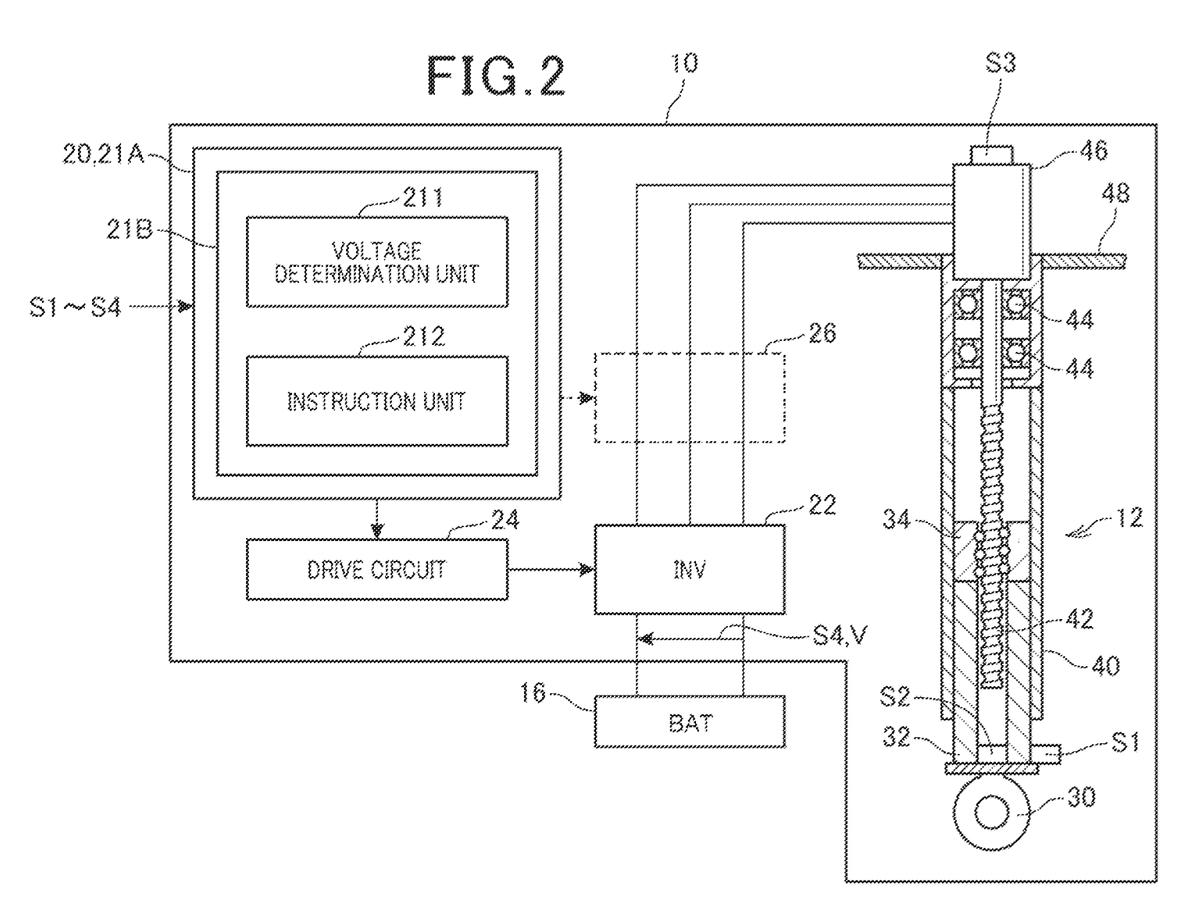
FIG. 2 is a diagram showing an example of a configuration of the electric suspension apparatus.

FIG. 1 is a perspective view showing an example of arrangement of an electric suspension apparatus 10. FIG. 2 is a diagram showing an example of a configuration of the electric suspension apparatus 10.

Description will be made as to the electric suspension apparatus 10 with reference to FIGS. 1 and 2.

As shown in FIG. 1, a vehicle 1 includes a vehicle body BD, four wheels TRs, and the electric suspension apparatus 10. The electric suspension apparatus 10 includes an electric actuator 12, and an electric suspension control ECU 20.

The electric actuator 12 is composed of a first electric actuator 12A, a second electric actuator 12B, a third electric actuator 12C, and a fourth electric actuator 12D. The first electric actuator 12A is disposed between the vehicle body BD and a right front wheel. The second electric actuator 12B is disposed between the vehicle body BD and a left front wheel. The third electric actuator 12C is disposed between the vehicle body BD and a right rear wheel. The fourth electric actuator 12D is disposed between the vehicle body BD and a left rear wheel.

The electric suspension control electronic control unit (ECU) 20 controls each of the first electric actuator 12A to the fourth electric actuator 12D. The electric suspension control ECU 20 is connected to each of the first electric actuator 12A to the fourth electric actuator 12D via a power line 13 and a signal line 14.

The power line 13 supplies power from a battery 16 shown in FIG. 2 to each of the first electric actuator 12A to the fourth electric actuator 12D. Also, the power line 13 supplies, to the battery 16 shown in FIG. 2, regenerative power generated in each of the first electric actuator 12A to the fourth electric actuator 12D. The signal line 14 transmits detection signals of a sensor S1 to a sensor S4 shown in FIG. 2 to the electric suspension control ECU 20.

Description will be made as to the sensor S1 to the sensor S4 with reference to FIG. 2.

In the following description, the electric suspension control ECU 20 may be described as the control ECU 20 for convenience.

The first electric actuator 12A to the fourth electric actuator 12D include about the same configuration, and hence in a case where each of the first electric actuator 12A to the fourth electric actuator 12D is not distinguished, each of the first electric actuator 12A to the fourth electric actuator 12D may be described below simply as the electric actuator 12.

Next, description will be made as to a configuration of the electric actuator 12 with reference to FIG. 2.

As shown in FIG. 2, the electric actuator 12 includes a coupling part 30, an inner tube 32 and a nut 34 as members on a wheel TR side. Also, the electric actuator 12 includes an outer tube 40, a screw shaft 42, a bearing 44, and a motor 46 as members on a vehicle body BD side. The outer tube 40, the bearing 44 and the motor 46 are fixed to a chassis 48 disposed in a lower part of the vehicle body BD.

Description will be made as to a configuration of the motor 46 with reference to FIG. 3A.

The screw shaft 42 is supported by the bearing 44 and the nut 34. The nut 34 has an inner surface screwed into a screw groove formed in an outer surface of the screw shaft 42 via a bearing.

When the motor 46 rotates the screw shaft 42, the nut 34 is moved in an up-down direction. When moving the nut 34 downward, the inner tube 32 is moved downward. When moving the nut 34 upward, the inner tube 32 is moved upward.

Consequently, a position of the inner tube 32 in the up-down direction to the outer tube 40 fixed to the chassis 48 of the vehicle body BD can be adjusted.

The coupling part 30 is fixed to a knuckle (not shown) of the suspension apparatus, and is accordingly coupled to the wheel TR. When inputting vibration from the wheel TR side into the coupling part 30 and applying, for example, an upward acceleration α to the coupling part 30, the inner tube 32 and the nut 34 are raised integrally with the outer tube 40. In this case, the motor 46 rotates the screw shaft 42 to move the inner tube 32 in a direction to absorb the upward acceleration α, i.e., in an upward direction, so that vibration from the wheel TR to the vehicle body BD can be attenuated.

In the electric actuator 12, an acceleration sensor S1, a stroke sensor S2 and a rotation angle sensor S3 are arranged.

The acceleration sensor S1 is fixed to, for example, an outer circumferential surface of the inner tube 32, to detect the acceleration α applied from the wheel TR side to the coupling part 30. The acceleration sensor S1 may be configured to be mounted in the vicinity of the chassis 48 and the motor 46, for detecting the acceleration on the vehicle body BD side.

The stroke sensor S2 is disposed at a position facing the screw shaft 42 of the inner tube 32, to detect a stroke ST indicating a downward moving amount of the nut 34. The stroke sensor S2 is composed of a distance measurement sensor or the like.

The rotation angle sensor S3 is composed of a so-called resolver or the like, to detect a rotation angle θ of the motor 46.

The voltage sensor S4 is a sensor which detects a drive voltage V applied to the motor 46, and the sensor may only detect a power source voltage state of the battery 16, and a state of a regenerative voltage in a case where the motor 46 is regenerated. The voltage sensor S4 detects a voltage between terminals of the battery 16 as the drive voltage V, for example, as shown in FIG. 3A. In a state where the motor 46 is driven with the power from the battery 16, the drive voltage V indicates a power source voltage of the battery 16. In a state where the regenerative power is generated by the motor 46, the drive voltage V indicates an electromotive force of the motor 46.

The acceleration α, the stroke ST, the rotation angle θ and the drive voltage V are outputted to the control ECU 20.

2. Configuration of Electric Suspension Control ECU

The control ECU 20 controls the motor 46 through an inverter 22, based on detection results of the acceleration sensor S1, the stroke sensor S2, the rotation angle sensor S3 and the voltage sensor S4.

Description will be made as to a configuration of the inverter 22 with reference to FIG. 3A.

The control ECU 20 includes a memory 21A and a processor 21B.

The memory 21A is a storage device which stores, in a nonvolatile manner, a program to be executed by the processor 21B and data. The memory 21A is composed of a magnetic storage device, a semiconductor storage element such as a flash read only memory (ROM), or another type of nonvolatile storage device. Also, the memory 21A may include a random-access memory (RAM) included in a work area of the processor 21B. The memory 21A stores data to be processed by the control ECU 20, and a control program to be executed by the processor 21B.

The processor 21B may be composed of a single processor, or a plurality of processors which function as the processor 21B. The processor 21B executes the control program to control each part of the electric suspension apparatus 10.

The control ECU 20 includes a voltage determination unit 211 and an instruction unit 212. Specifically, the processor 21B of the control ECU 20 executes the control program, to function as the voltage determination unit 211 and the instruction unit 212.

The voltage determination unit 211 determines whether the drive voltage V is equal to or more than a predetermined voltage VA.

Specifically, the voltage determination unit 211 determines whether the drive voltage V is equal to or more than the predetermined voltage VA in one of the first electric actuator 12A to the fourth electric actuator 12D. Note that the predetermined voltage VA is larger than the power source voltage of the battery 16.

The power source voltage of the battery 16 is, for example, 48 V. The predetermined voltage VA is, for example, 54 V.

Also, the voltage determination unit 211 may determine whether a change amount ΔV of the drive voltage V per unit time is equal to or more than a predetermined change amount ΔVA. The change amount ΔV indicates a change amount of the drive voltage V per unit time (e.g., 5 msec).

Specifically, the voltage determination unit 211 may determine whether a change amount ΔV of the electromotive force generated by the motor 46 per unit time is equal to or more than a predetermined change amount ΔVA in a state where the regenerative power is generated by the motor 46 in one of the first electric actuator 12A to the fourth electric actuator 12D. Also, the voltage determination unit 211 may perform the determination by the predetermined voltage VA and the determination by the predetermined change amount ΔVA.

The instruction unit 212 short-circuits the motor 46 of each of the first electric actuator 12A to the fourth electric actuator 12D depending on determination result of the voltage determination unit 211.

Specifically, in a case where the voltage determination unit 211 determines that the drive voltage V associated with the electromotive force generated by the motor 46 is equal to or more than the predetermined voltage VA, the instruction unit 212 executes processing as follows. Specifically, the instruction unit 212 short-circuits the motor 46 of each of the first electric actuator 12A to the fourth electric actuator 12D, by fixing the inverter 22 in an on state through a drive circuit 24.

Also, the instruction unit 212 performs processing as follows, in a case where the voltage determination unit 211 determines that the drive voltage V associated with the electromotive force of the motor 46 is equal to or more than the predetermined voltage VA in association with stroke fluctuation of the electric actuator 12 disposed in the front wheel, i.e., at least one of the first electric actuator 12A and the second electric actuator 12B.

Specifically, the instruction unit 212 holds the short circuit of the motor 46 of each of the first electric actuator 12A to the fourth electric actuator 12D until stroke fluctuation of the electric actuator 12 disposed in the rear wheel, i.e., at least one of the third electric actuator 12C and the fourth electric actuator 12D ends. Note that the stroke fluctuation of the electric actuator 12 disposed in the rear wheel indicates stroke fluctuation corresponding to the stroke fluctuation of the electric actuator 12 disposed in the front wheel.

Examples of the stroke fluctuation includes fluctuation that lengthens the stroke ST, fluctuation that shortens the stroke ST, fluctuation that lengthens and then shortens the stroke ST, and fluctuation that shortens and then lengthens the stroke ST.

The fluctuation that lengthens the stroke ST occurs in a case where a step that lowers in a travel direction is present on a road surface on which the vehicle 1 runs. For example, in a case where the vehicle 1 passes such a step and the voltage determination unit 211 accordingly determines that the electromotive force of the motor 46 is equal to or more than the predetermined voltage VA in association with the stroke fluctuation of the electric actuator 12 disposed in the front wheel, the instruction unit 212 holds the short circuit of the motor 46 of each of the first electric actuator 12A to the fourth electric actuator 12D until the rear wheel passes this step.

The fluctuation that shortens the stroke ST occurs in a case where a step that heightens in the travel direction is present on the road surface on which the vehicle 1 runs.

The fluctuation that lengthens and then shortens the stroke ST occurs in a case where a depression is present in the road surface on which the vehicle 1 runs.

The fluctuation that shortens and then lengthens the stroke ST occurs in a case where a projection is present on the road surface on which the vehicle 1 runs.

Also, in a case of short-circuiting the motor 46 of each of the first electric actuator 12A to the fourth electric actuator 12D, the instruction unit 212 stops supply of power to each of the first electric actuator 12A to the fourth electric actuator 12D.

Specifically, the instruction unit 212 stops the supply of the power to each of the first electric actuator 12A to the fourth electric actuator 12D, by fixing the inverter 22 in an off state.

Description will be made as to the drive circuit 24 and the inverter 22 with reference to FIG. 3A.

3. Configuration of Inverter

As shown in FIG. 2, the control ECU 20 controls the inverter 22 through the drive circuit 24. The control ECU 20 controls a rotation direction and a rotation speed of the motor 46 through the inverter 22.

Figure 3A:
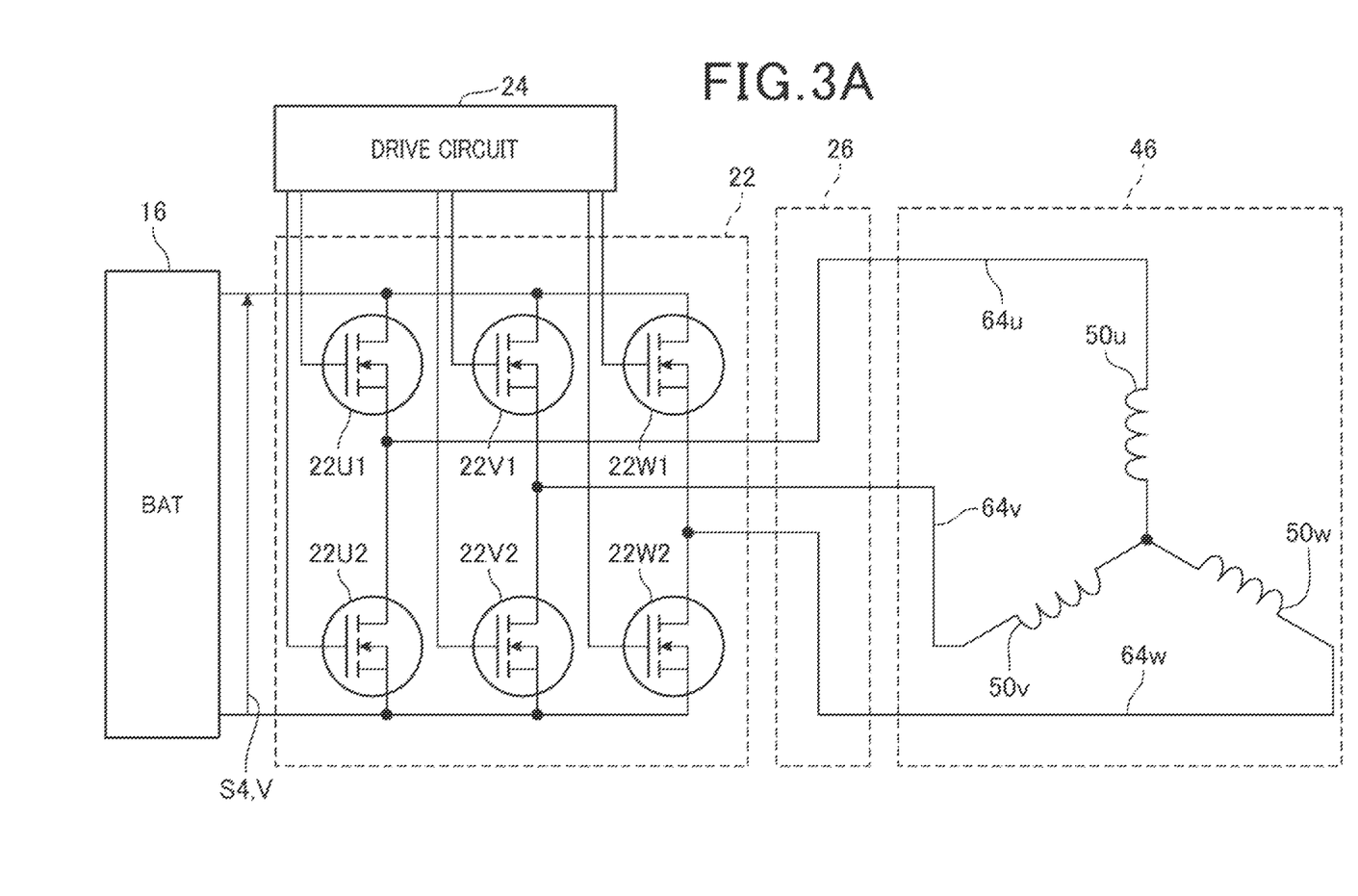
FIG. 3A is a diagram showing an example of a configuration of an inverter.

FIG. 3A is a diagram showing an example of a configuration of the inverter 22.

As shown in FIG. 3A, the inverter 22 includes a metal-oxide-semiconductor field effect transistor (MOSFET) 22U1, a MOSFET 22U2, a MOSFET 22V1, a MOSFET 22V2, a MOSFET 22W1, and a MOSFET 22W2. Each of these six MOSFETs turns on and off based on an instruction from the control ECU 20.

The motor 46 is, for example, a three-phase AC brushless motor, and includes three motor coils 50$u$, 50$v$, and 50$w$ as shown in FIG. 3A.

The motor 46 rotationally drives the screw shaft 42 with the power supplied from the battery 16 through the inverter 22.

Furthermore, the motor 46 generates the regenerative power based on an external force inputted from the wheel TR side into the screw shaft 42, and outputs the generated power to the battery 16.

The instruction unit 212 of the control ECU 20 short-circuits the motor 46 by fixing three MOSFETs on a low side of the inverter 22, i.e., the MOSFETs 22U2, 22V2 and 22W2 in an on state.

Also, the instruction unit 212 of the control ECU 20 stops the supply of the power from the battery 16 to the motor 46 by fixing three MOSFETs on a high side of the inverter 22, i.e., the MOSFETs 22U1, 22V1, and 22W1 in an off state.

4. Configuration of Short Circuit

Figure 3B:
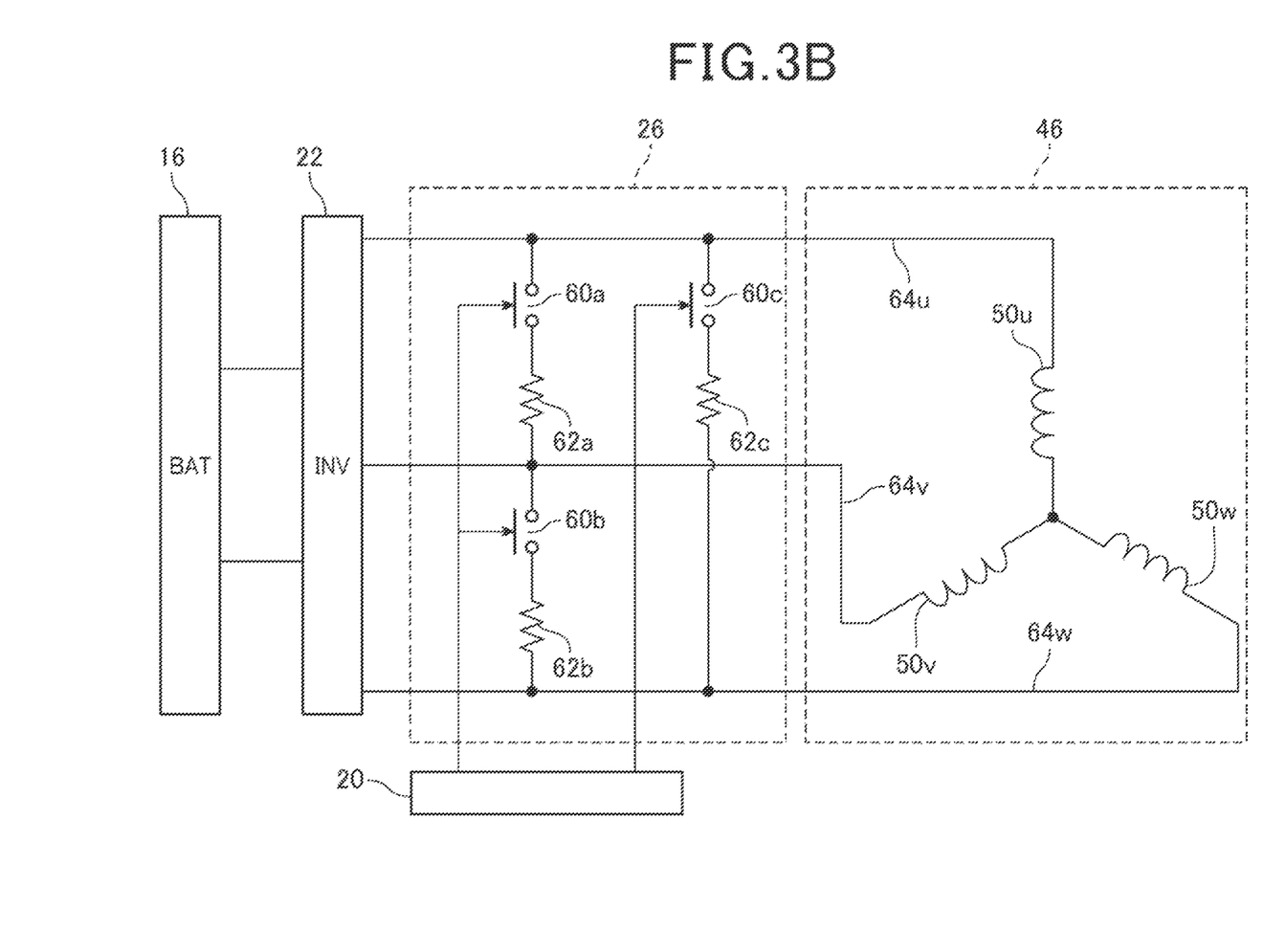
FIG. 3B is a diagram showing an example of a configuration of a short circuit.

The present embodiment describes but is not limited to a case where the motor 46 is short-circuited by the inverter 22. As shown in FIG. 3B, the motor 46 may be short-circuited by a short circuit 26 in which a relay switch is used as shown in FIG. 3B.

As shown in FIG. 3B, the short circuit 26 is disposed between the inverter 22 and the motor 46. The short circuit 26 includes relay switches 60$a$, 60$b$, and 60$c$ which turn on and off following an instruction from the control ECU 20, and resistors 62$a$, 62$b$, and 62$c$.

The relay switch 60$a$ short-circuits power lines 64$u$ and 64$v$ corresponding to the motor coils 50$u$ and 50$v$, respectively, following an instruction from the instruction unit 212. The resistor 62$a$ adjusts current flowing through the motor coils 50$u$ and 50$v$, in a case where the relay switch 60$a$ short-circuits the power lines 64$u$ and 64$v$.

The relay switch 60$b$ short-circuits the power line 64$v$ and a power line 64$w$ corresponding to the motor coils 50$v$ and 50$w$, respectively, following an instruction from the instruction unit 212. The resistor 62$b$ adjusts current flowing through the motor coils 50$v$ and 50$w$, in a case where the relay switch 60$b$ short-circuits the power lines 64$v$ and 64$w$.

The relay switch 60$c$ short-circuits the power lines 64$u$ and 64$w$ corresponding to the motor coils 50$u$ and 50$w$, respectively, following an instruction from the instruction unit 212. The resistor 62$c$ adjusts current flowing through the motor coils 50$u$ and 50$w$, in a case where the relay switch 60$c$ short-circuits the power lines 64$u$ and 64$w$.

As the relay switches 60$a$, 60$b$, and 60$c$, normally closed relay switches are used, so that the motor 46 can be short-circuited irrespective of a state of the drive voltage V. For example, the motor 46 can be short-circuited also in a case where all MOSFETs of the inverter 22 are in an off state due to voltage abnormality of the drive voltage V.

FIG. 3B shows an example where the short circuit 26 includes three relay switches 60$a$ to 60$c$, but the short circuit 26 may include, for example, a circuit configuration only including two relay switches 60$a$ and 60$b$ to short-circuit three phases of the motor 46 by the relay switches 60$a$ and 60$b$. Alternatively, the short circuit 26 may include a circuit configuration from which the mounted resistors 62$a$ to 62$c$ are omitted depending on properties of the motor 46.

5. Processing of Control ECU 20

Figure 4:
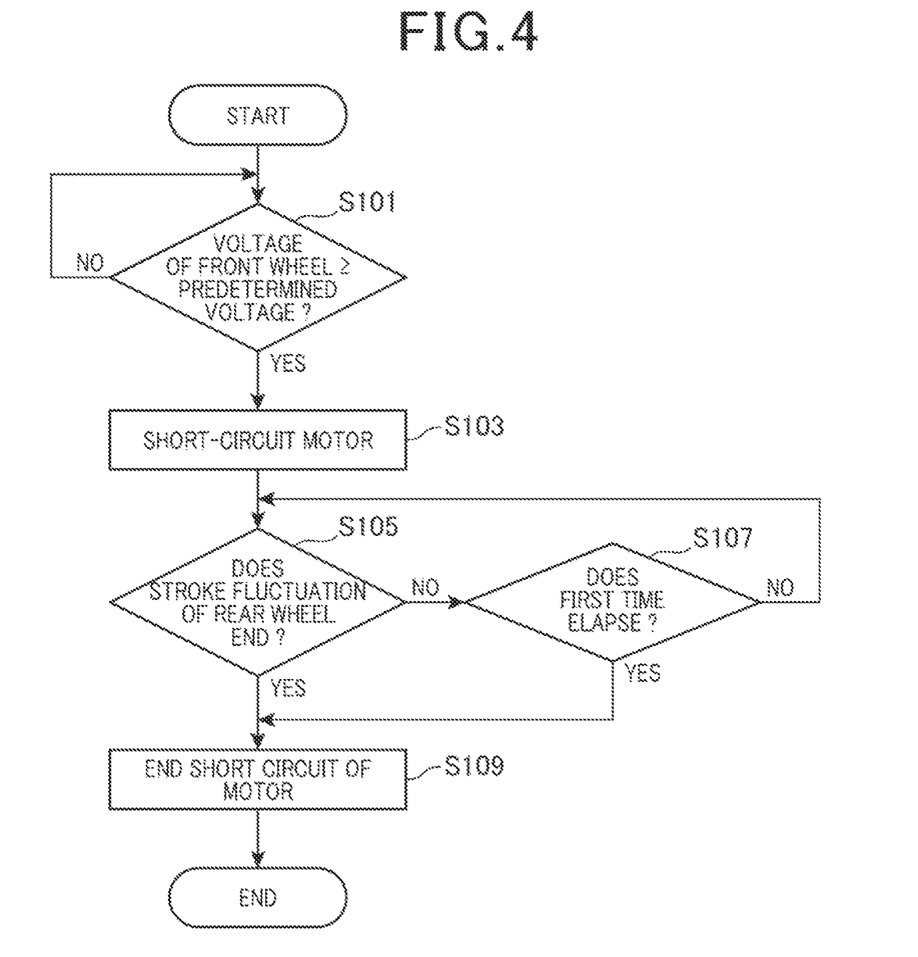
FIG. 4 is a flowchart showing an example of processing of a control ECU.

FIG. 4 is a flowchart showing an example of processing of the electric suspension control ECU 20. With reference to FIG. 4, description will be made as to a case where the voltage determination unit 211 determines whether the drive voltage V associated with the electromotive force generated by the motor 46 of the electric actuator 12 disposed in the front wheel is equal to or more than the predetermined voltage VA.

As shown in FIG. 4, first, the voltage determination unit 211 determines in step S101 whether the drive voltage V associated with the electromotive force generated by the motor 46 of the electric actuator 12 disposed in the front wheel, i.e., at least one of the first electric actuator 12A and the second electric actuator 12B is equal to or more than the predetermined voltage VA.

In a case where the voltage determination unit 211 determines that the drive voltage V associated with the electromotive force generated by the motor 46 of the electric actuator 12 disposed in the front wheel is not the predetermined voltage VA or more (NO in step S101), processing is in a standby state. In a case where the voltage determination unit 211 determines that the drive voltage V associated with the electromotive force generated by the motor 46 of the electric actuator 12 disposed in the front wheel is equal to or more than the predetermined voltage VA (YES in step S101), the processing advances to step S103.

Then, in the step S103, the instruction unit 212 short-circuits the motor 46 of each of the first electric actuator 12A to the fourth electric actuator 12D. Specifically, the instruction unit 212 short-circuits the motor 46 of each of the first electric actuator 12A to the fourth electric actuator 12D, by fixing, in an on state, a low side of the inverter 22 of each of the first electric actuator 12A to the fourth electric actuator 12D. Also, the instruction unit 212 stops the supply of the power from the battery 16 to the motor 46, by fixing, in an off state, a high side of the inverter 22 of each of the first electric actuator 12A to the fourth electric actuator 12D.

Next, the instruction unit 212 determines in step S105 whether the stroke fluctuation of the electric actuator 12 disposed in the rear wheel ends. Specifically, the instruction unit 212 determines whether the stroke fluctuation of the electric actuator 12 disposed in the rear wheel ends, for example, based on detection result of the stroke sensor S2.

In a case where the instruction unit 212 determines that the stroke fluctuation of the electric actuator 12 disposed in the rear wheel ends (YES in step S105), the processing advances to step S109. In a case where the instruction unit 212 determines that the stroke fluctuation of the electric actuator 12 disposed in the rear wheel does not end (NO in step S105), the processing advance to step S107.

Then, the instruction unit 212 determines in the step S107 whether first time T1 elapses from when the voltage determination unit 211 determines that the drive voltage V associated with the electromotive force generated by the motor 46 of the electric actuator 12 disposed in the front wheel is equal to or more than the predetermined voltage VA. The first time T1 is calculated, for example, by Equation (1) as follows based on a wheelbase HB of the vehicle 1 and a running speed VD of the vehicle 1.

$$T1=(HB/VD)+\Delta T \quad (1)$$

Time $\Delta T$ corresponds to a period of occurrence of the stroke fluctuation.

In a case where the instruction unit 212 determines that the first time T1 does not elapse (NO in step S107), the processing returns to the step S105. In a case where the instruction unit 212 determines that the first time T1 elapses (YES in step S107), the processing advances to the step S109.

Then, in the step S109, the instruction unit 212 ends the short circuit of the motor 46 of each of the first electric actuator 12A to the fourth electric actuator 12D. Also, the instruction unit 212 ends the stop of the power supply from the battery 16 to the motor 46 of each of the first electric actuator 12A to the fourth electric actuator 12D. Afterward, the processing ends.

As described with reference to FIG. 4, in the case where the voltage determination unit 211 determines that the drive voltage V is equal to or more than the predetermined voltage VA in association with the stroke fluctuation of the electric actuator 12 disposed in the front wheel, the instruction unit 212 holds the short circuit of the motor 46 of each of the first electric actuator 12A to the fourth electric actuator 12D until the stroke fluctuation of the electric actuator 12 disposed in the rear wheel ends. Therefore, rapid rise in drive voltage V in association with the stroke fluctuation of the electric actuator 12 disposed in the rear wheel can be suppressed.

Figure 5:
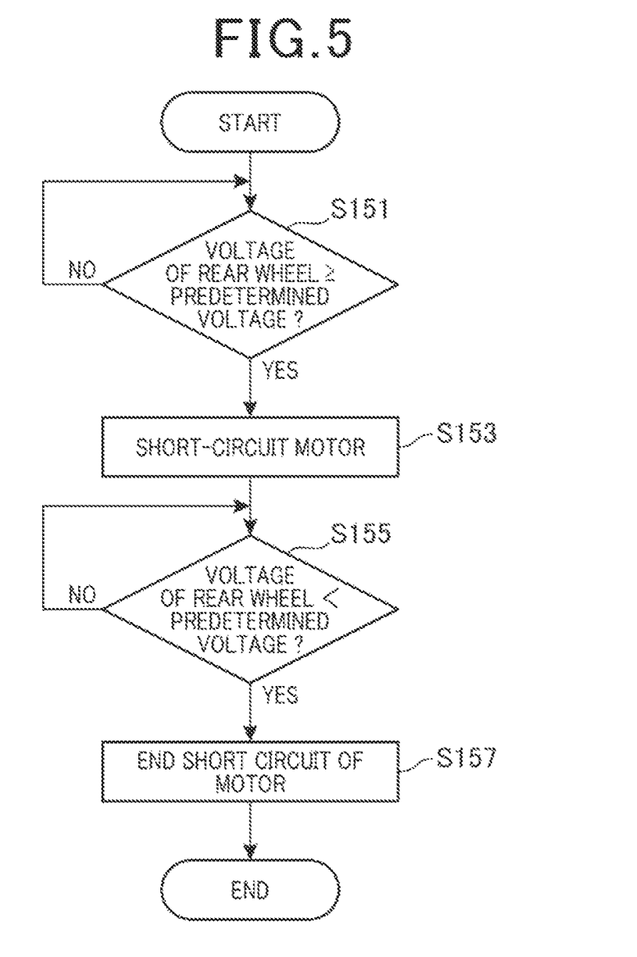
FIG. 5 is a flowchart showing an example of processing of the control ECU.

FIG. 5 is a flowchart showing an example of processing of the electric suspension control ECU 20. With reference to FIG. 5, description will be made as to a case where the voltage determination unit 211 determines whether the drive voltage V associated with the electromotive force generated by the motor 46 of the electric actuator 12 disposed in the rear wheel is equal to or more than the predetermined voltage VA.

As shown in FIG. 5, first, the voltage determination unit 211 determines in step S151 whether the drive voltage V associated with the electromotive force generated by the motor 46 of the electric actuator 12 disposed in the rear wheel, i.e., at least one of the third electric actuator 12C and the fourth electric actuator 12D is equal to or more than the predetermined voltage VA.

In a case where the voltage determination unit 211 determines that the drive voltage V associated with the electromotive force generated by the motor 46 of the electric actuator 12 disposed in the rear wheel is not the predetermined voltage VA or more (NO in step S151), processing is in a standby state. In a case where the voltage determination unit 211 determines that the drive voltage V associated with the electromotive force generated by the motor 46 of the electric actuator 12 disposed in the rear wheel is equal to or more than the predetermined voltage VA (YES in step S151), the processing advances to step S153.

Then, in the step S153, the instruction unit 212 short-circuits the motor 46 of each of the first electric actuator 12A to the fourth electric actuator 12D. Specifically, the instruction unit 212 short-circuits the motor 46 of each of the first electric actuator 12A to the fourth electric actuator 12D, by fixing, in the on state, the low side of the inverter 22 of each of the first electric actuator 12A to the fourth electric actuator 12D. Also, the instruction unit 212 stops the power supply from the battery 16 to the motor 46, by fixing, in the off state, the high side of the inverter 22 of each of the first electric actuator 12A to the fourth electric actuator 12D.

Next, the instruction unit 212 determines in step S155 whether the drive voltage V associated with the electromotive force generated by the motor 46 of the electric actuator 12 disposed in the rear wheel is less than the predetermined voltage VA.

In a case where the instruction unit 212 determines that the drive voltage V associated with the electromotive force generated by the motor 46 of the electric actuator 12 disposed in the rear wheel is not less than the predetermined voltage VA (NO in step S155), processing is in a standby state. In a case where the instruction unit 212 determines that the drive voltage V associated with the electromotive force generated by the motor 46 of the electric actuator 12 disposed in the rear wheel is less than the predetermined voltage VA (YES in step S155), the processing advances to step S157.

Then, in the step S157, the instruction unit 212 ends the short circuit of the motor 46 of each of the first electric actuator 12A to the fourth electric actuator 12D. Also, the instruction unit 212 ends the stop of the power supply from the battery 16 to the motor 46 of each of the first electric actuator 12A to the fourth electric actuator 12D. Afterward, the processing ends.

As described with reference to FIG. 5, the instruction unit 212 short-circuits the motor 46 of each of the first electric actuator 12A to the fourth electric actuator 12D, in a case where the drive voltage V associated with the electromotive force generated by the motor 46 of the electric actuator 12 disposed in the rear wheel is equal to or more than the predetermined voltage VA. Then, the instruction unit 212 ends the short circuit of the motor 46 of each of the first electric actuator 12A to the fourth electric actuator 12D, in a case where the drive voltage V associated with the electromotive force generated by the motor 46 of the electric actuator 12 disposed in the rear wheel is less than the predetermined voltage VA. Therefore, rapid rise in drive voltage V due to the stroke fluctuation of the electric actuator 12 disposed in the rear wheel can be suppressed.

Also, as described with reference to FIGS. 4 and 5, in the case of short-circuiting the motor 46 of each of the first electric actuator 12A to the fourth electric actuator 12D, the instruction unit 212 stops the power supply from the battery 16 to the motor 46 by fixing, in the off state, the high side of the inverter 22 of each of the first electric actuator 12A to the fourth electric actuator 12D. Therefore, overcurrent can be inhibited from flowing through the motor 46 of each of the first electric actuator 12A to the fourth electric actuator 12D.

6. Configurations and Effects

As described above, an electric suspension apparatus 10 according to the present embodiment is an electric suspension apparatus 10 including an electric actuator 12 mounted in a vehicle 1, the electric actuator being driven with a motor 46, wherein in a case where a drive voltage V of the motor 46 is equal to or more than a predetermined voltage VA, the motor 46 is short-circuited.

According to this configuration, in the case where the drive voltage V of the motor 46 is equal to or more than the predetermined voltage VA, the motor 46 is short-circuited, so that rapid rise in drive voltage V due to regenerative power of the motor 46 can be suppressed.

Also, in the electric suspension apparatus 10, in a case where a change amount ΔV of the drive voltage V per unit time is equal to or more than a predetermined change amount ΔVA, the motor 46 is short-circuited.

According to this configuration, in the case where the change amount ΔV of the drive voltage V per unit time is equal to or more than the predetermined change amount ΔVA, the motor 46 is short-circuited, so that the rapid rise in drive voltage V due to the regenerative power of the motor 46 can be suppressed.

Further, in the electric suspension apparatus 10, in a case of short-circuiting the motor 46, supply of power to the motor 46 is stopped.

According to this configuration, in the case of short-circuiting the motor 46, the supply of the power to the motor 46 is stopped, so that overcurrent can be inhibited from flowing through the motor 46.

Additionally, in the electric suspension apparatus 10, the electric actuator 12 is disposed in each of a plurality of wheels TRs, and in a case where the drive voltage V is equal to or more than the predetermined voltage VA in association with stroke fluctuation of the electric actuator 12 disposed in a front wheel, the short circuit of the motor 46 disposed in each of the plurality of wheels TRs is held until stroke fluctuation of the electric actuator 12 disposed in a rear wheel ends.

According to this configuration, in the case where the electromotive force of the motor 46 is equal to or more than the predetermined voltage VA in association with the stroke fluctuation of the electric actuator 12 disposed in the front wheel, the short circuit of the motor 46 disposed in each of the plurality of wheels TRs is held until the stroke fluctuation of the electric actuator 12 disposed in the rear wheel ends. Therefore, the rapid rise in drive voltage V due to the regenerative power of the motor 46 in association with the stroke fluctuation of the electric actuator 12 disposed in the rear wheel can be suppressed.

7. Another Embodiment

Note that the present invention is not limited to the above configuration of the embodiment, and the invention can be implemented in various aspects without departing from the scope of the invention.

For example, the above embodiment describes but is not limited to the case where the electric suspension apparatus 10 includes the first electric actuator 12A to the fourth electric actuator 12D. For example, the electric suspension apparatus 10 may include the third electric actuator 12C and the fourth electric actuator 12D, and the apparatus does not have to include the first electric actuator 12A and the second electric actuator 12B. Conversely, the electric suspension apparatus 10 may include the first electric actuator 12A and the second electric actuator 12B, and the apparatus does not have to include the third electric actuator 12C and the fourth electric actuator 12D.

Also, the above embodiment describes but is not limited to the case where the instruction unit 212 determines whether the stroke fluctuation of the electric actuator 12 disposed in the rear wheel ends, based on the detection result of the stroke sensor S2. The instruction unit 212 may determine whether the stroke fluctuation of the electric actuator 12 disposed in the rear wheel ends, for example, based on the detection result of the voltage sensor S4.

Further, the above embodiment describes but is not limited to the case where the instruction unit 212 short-circuits the motor 46 by fixing the inverter 22 in the on state. For example, the electric suspension apparatus 10 may include a short circuit which short-circuits the motor 46, and the instruction unit 212 may short-circuit the motor 46 through the short circuit.

At least part of the respective functional blocks shown in FIG. 2 may be achieved in hardware, or in hardware and software, and is not limited to a configuration to arrange independent hardware resources as shown in the drawing.

The control program executed by the processor 21B of the electric suspension control ECU 20 of the electric suspension apparatus 10 is stored in the memory 21A, but the control program may be stored in an external HDD or the like.

The processing units of the flowchart shown in each of FIGS. 4 and 5 are divided depending on main processing content, to facilitate understanding of the processing of the electric suspension control ECU 20 of the electric suspension apparatus 10. The embodiment is not limited by a dividing method or name of the processing unit shown in the flowchart of each of FIGS. 4 and 5. The processing of the electric suspension control ECU 20 may be further divided into more processing units depending on processing content, and one processing unit may be divided to include further processing. The above processing order in the flowchart is not limited to the shown example.

A control method of the electric suspension control ECU 20 can be achieved by allowing the processor 21B of the electric suspension control ECU 20 to execute a control program corresponding to the control method of the electric suspension control ECU 20. The control program can be recorded in advance in a computer readable recording medium. As the recording medium, a magnetic or optical recording medium or a semiconductor memory device may be used. Specifically, examples of the recording medium include a portable recording medium such as a flexible disk, a compact disk read only memory (CD-ROM), a digital versatile disc (DVD), Blue-ray (registered trademark) disc, a magneto-optic disk, a flash memory, or a card recording medium, and a fixed recording medium. The recording medium may be a nonvolatile storage device such as RAM, ROM, HDD, or another internal storage device included in the electric suspension apparatus 10. The control method of the electric suspension control ECU 20 may be achieved by storing the control program corresponding to the control method of the electric suspension control ECU 20 in a server device or the like, and by downloading the control program from the server device to the electric suspension control ECU 20.

8. Configurations Supported by the Above Embodiment

The above embodiment supports the following configurations.

(Configuration 1)

An electric suspension apparatus including an electric actuator mounted in a vehicle, the electric actuator being driven with a motor, wherein in a case where a drive voltage of the motor is equal to or more than a predetermined voltage, the motor is short-circuited.

According to the electric suspension apparatus of configuration 1, for example, in a case where an electromotive force generated by the motor, that is, the drive voltage is equal to or more than the predetermined voltage in a state where regenerative power is generated by the motor, the motor is short-circuited, so that rapid rise in drive voltage due to the regenerative power of the motor can be suppressed.

(Configuration 2)

The electric suspension apparatus according to configuration 1, wherein in a case where a change amount of the drive voltage per unit time is equal to or more than a predetermined change amount, the motor is short-circuited.

According to the electric suspension apparatus of configuration 2, in the case where the change amount of the drive voltage is equal to or more than the predetermined change amount, the motor is short-circuited, so that the rapid rise in drive voltage due to the regenerative power of the motor can be suppressed.

(Configuration 3)

The electric suspension apparatus according to configuration 1 or 2, wherein in a case of short-circuiting the motor, supply of power to the motor is stopped.

According to the electric suspension apparatus of configuration 3, in the case of short-circuiting the motor, the supply of the power to the motor is stopped, so that overcurrent can be inhibited from flowing through the motor.

(Configuration 4)

The electric suspension apparatus according to any one of configurations 1 to 3, wherein the electric actuator is disposed in each of a plurality of wheels, and in a case where the drive voltage is equal to or more than the predetermined voltage in association with stroke fluctuation of the electric actuator disposed in a front wheel, the short circuit of the motor disposed in each of the plurality of wheels is held until stroke fluctuation of the electric actuator disposed in a rear wheel ends.

According to the electric suspension apparatus of configuration 4, in the case where the drive voltage is equal to or more than the predetermined voltage in association with the stroke fluctuation of the electric actuator disposed in the front wheel, the short circuit of the motor disposed in each of the plurality of wheels is held until the stroke fluctuation of the electric actuator disposed in the rear wheel ends. Therefore, rapid rise in drive voltage due to the regenerative power of the motor in association with the stroke fluctuation of the electric actuator disposed in the rear wheel can be suppressed.

REFERENCE SIGNS LIST 1 vehicle
10 electric suspension apparatus
12 electric actuator
12A first electric actuator
12B second electric actuator
12C third electric actuator
12D fourth electric actuator
13 power line
14 signal line
20 electric suspension control ECU
21A memory
21B processor
211 voltage determination unit
212 instruction unit
22 inverter
22U1, 22U2, 22V1, 22V2, 22W1 and 22W2 MOSFET
26 short circuit
30 coupling part
32 inner tube
34 nut
40 outer tube
42 screw shaft
44 bearing
46 motor
50$u$, 50$v$ and 50$w$ motor coil
60$a$, 60$b$ and 60$c$ relay switch
62$a$, 62$b$ and 62$c$ resistor
64$u$, 64$v$ and 64$w$ power line
BD vehicle body
HB wheelbase
S1 acceleration sensor
S2 stroke sensor
S3 rotation angle sensor
S4 voltage sensor
ST stroke T1 first time
TR wheel
V drive voltage
VA predetermined voltage
VD running speed
α acceleration
θ rotation angle
ΔT time
ΔV change amount
ΔVA predetermined change amount

What is claimed is:

1. An electric suspension apparatus comprising:
a processor; and
an electric actuator mounted in a vehicle,
wherein the electric actuator being driven with a motor,
wherein the electric actuator includes a screw shaft and a nut screwed to the screw shaft,
wherein in a case where a drive voltage of the motor is equal to or more than a predetermined voltage, the processor short-circuits the motor, and
wherein in a case where a change amount of the drive voltage per unit time is equal to or more than a predetermined change amount, the processor short-circuits the motor.

2. The electric suspension apparatus according to claim 1, wherein in a case of short-circuiting the motor, the processor stops supply of power to the motor.

3. An electric suspension apparatus comprising:
a processor; and
an electric actuator mounted in a vehicle,
wherein the electric actuator being driven with a motor,
wherein the electric actuator includes a screw shaft and a nut screwed to the screw shaft,
wherein in a case where a drive voltage of the motor is equal to or more than a predetermined voltage, the processor short-circuits the motor,
wherein the electric actuator is disposed in each of a plurality of wheels, and
wherein in a case where the drive voltage is equal to or more than the predetermined voltage in association with stroke fluctuation of the electric actuator disposed in a front wheel, the processor holds the short circuit of the motor disposed in each of the plurality of wheels until stroke fluctuation of the electric actuator disposed in a rear wheel ends.

4. The electric suspension apparatus according to claim 3, wherein in a case of short-circuiting the motor, the processor stops supply of power to the motor.

* * * * *